United States Patent
Tanabe et al.

(10) Patent No.: US 10,771,728 B2
(45) Date of Patent: Sep. 8, 2020

(54) ELECTRONIC DEVICE, CONTROL METHOD, AND RECORDING MEDIUM FOR DISPLAYING IMAGES BASED ON DETERMINED STATE

(71) Applicant: KYOCERA Corporation, Kyoto-shi, Kyoto (JP)

(72) Inventors: Shigeki Tanabe, Yokohama (JP); Yasuhiro Ueno, Yokohama (JP); Hideki Morita, Yokohama (JP); Isao Masuike, Machida (JP); Koutaro Yamauchi, Yokohama (JP); Manabu Sakuma, Yokohama (JP); Kenji Shimada, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 16/269,535

(22) Filed: Feb. 6, 2019

(65) Prior Publication Data
US 2019/0246060 A1    Aug. 8, 2019

(30) Foreign Application Priority Data

Feb. 7, 2018  (JP) ................................ 2018-020238

(51) Int. Cl.
*H04N 5/445*    (2011.01)
*H04N 5/272*    (2006.01)
(Continued)

(52) U.S. Cl.
CPC ......... *H04N 5/44504* (2013.01); *H04N 5/272* (2013.01); *G01K 1/14* (2013.01);
(Continued)

(58) Field of Classification Search
CPC .............. H04N 5/44504; H04N 5/272; H04N 5/23293; G06F 3/0488; G06F 3/04847;
(Continued)

(56) References Cited

U.S. PATENT DOCUMENTS

2009/0125234 A1* 5/2009 Geelen ............... G01C 21/3647
                                                                701/533
2017/0255262 A1* 9/2017 Liu ......................... G06F 3/015
(Continued)

FOREIGN PATENT DOCUMENTS

JP    2017-158186 A    9/2017

*Primary Examiner* — Gevell V Selby
(74) *Attorney, Agent, or Firm* — Hauptman Ham, LLP

(57) ABSTRACT

An electronic device includes a display (display unit), a camera (imaging unit), sensors, and a controller. The controller determines the state of the electronic device on the basis of a detection result of a first sensor among the sensors. The controller causes the display to display, when the determined state is a first state, a first overlay image in which first sensor information based on a detection result of a second sensor among the sensors is overlaid on an image captured by the camera. The controller causes the display to display, when the determined state is a second state, a second overlay image in which second sensor information based on the detection result of the second sensor among the plurality of sensors is overlaid on the image captured by the camera. The second sensor information differs from the first sensor information.

19 Claims, 12 Drawing Sheets

(51) Int. Cl.
*G06F 3/0488* (2013.01)
*G01V 7/00* (2006.01)
*G01K 1/14* (2006.01)
*G01L 19/00* (2006.01)
*G06F 3/0484* (2013.01)

(52) U.S. Cl.
CPC ............ *G01L 19/0092* (2013.01); *G01V 7/00* (2013.01); *G06F 3/0488* (2013.01); *G06F 3/04847* (2013.01)

(58) Field of Classification Search
CPC .... G06F 3/0484; G06F 3/0304; G06F 1/1694; G06F 1/1686; G06F 1/1684; G06F 3/011; G01V 7/00; G01K 1/14; G01L 19/0092; A63B 24/0062
See application file for complete search history.

(56) References Cited

U.S. PATENT DOCUMENTS

2018/0239221 A1* 8/2018 Tano ................ H04N 5/2253
2018/0356636 A1* 12/2018 Kimura ................ G06F 3/013

\* cited by examiner

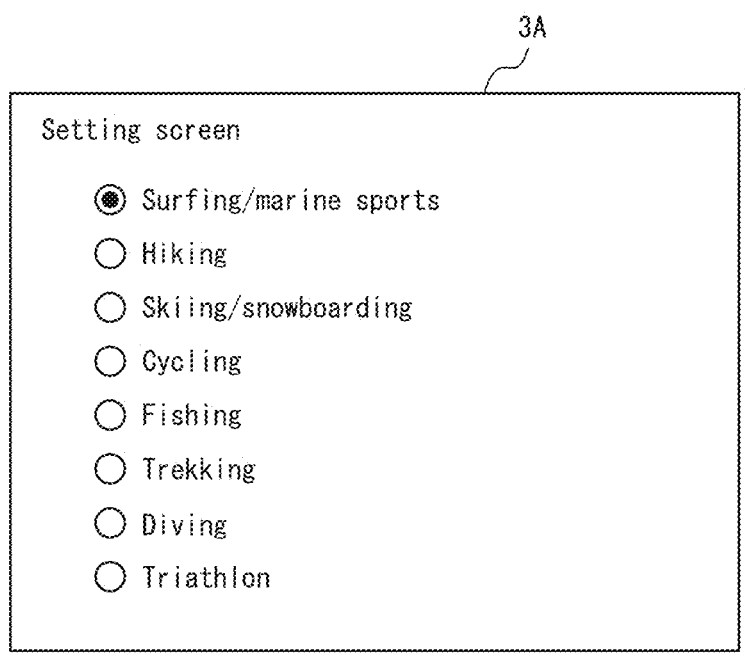

FIG. 7

| Sensor information \ Use | Surfing/marine sports | Hiking | Skiing/snowboarding | Cycling | Fishing | Trekking | Diving | Triathlon |
|---|---|---|---|---|---|---|---|---|
| Speed information | O | O | O | O | | | | O |
| Distance information | O | O | O | O | | | O | O |
| Height information | | O | O | O | | O | O | |
| Gravitational acceleration information | O | O | O | O | | | | O |
| Barometric pressure information | | O | O | | O | O | | |
| Travel path information | O | O | O | O | O | O | O | O |
| Wind speed information | | O | O | O | | | | O |
| Direction information | | O | O | O | | O | | O |
| Temperature information | O | O | O | O | O | O | O | O |

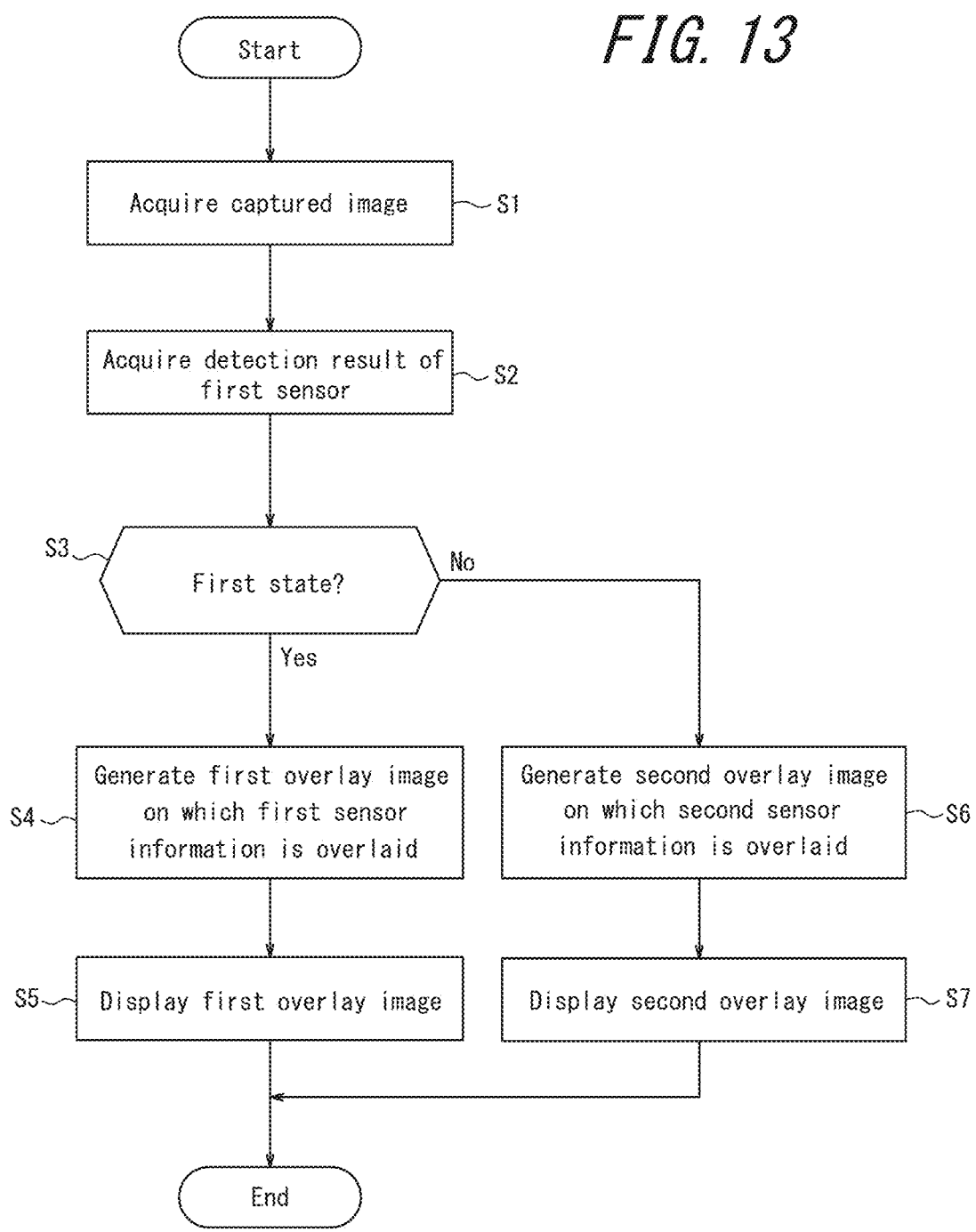

ELECTRONIC DEVICE, CONTROL METHOD, AND RECORDING MEDIUM FOR DISPLAYING IMAGES BASED ON DETERMINED STATE

CROSS-REFERENCE TO RELATED APPLICATION

This application claims priority to and benefit of Japanese Patent Application No. 2018-020238 filed on Feb. 7, 2018, the entire contents of which are incorporated herein by reference.

TECHNICAL FIELD

The present disclosure relates to an electronic device, a control method, and a recording medium.

BACKGROUND

Electronic devices have been provided with a variety of sensors. For example, a known mobile device includes a camera, a barometric pressure sensor that measures the barometric pressure, a touchscreen, and a controller. The controller infers that the mobile device is immersed in water on the basis of a detection result of the barometric pressure sensor and infers whether the mobile device that was immersed in water has been removed from the water on the basis of a detection result of the touchscreen. The controller of the known mobile device changes control of the function to capture, with the camera, at least one of a still image and a moving image on the basis of the detection result of at least one of the barometric pressure sensor and the touchscreen.

SUMMARY

An electronic device according to an aspect of the present disclosure includes a display, a camera, a plurality of sensors, and a controller. The controller determines a state of the electronic device on the basis of a detection result of a first sensor among the plurality of sensors. The controller causes the display to display, when the determined state is a first state, a first overlay image in which first sensor information based on a detection result of a second sensor among the plurality of sensors is overlaid on an image captured by the camera. The controller causes the display to display, when the determined state is a second state, a second overlay image in which second sensor information based on the detection result of the second sensor among the plurality of sensors is overlaid on the image captured by the camera. The second sensor information differs from the first sensor information.

A method according to an aspect of the present disclosure is a method for controlling an electronic device including a display, a camera, a plurality of sensors, and a controller. The method includes determining, using the controller, a state of the electronic device on the basis of a detection result of a first sensor among the plurality of sensors. The method includes causing the display to display, using the controller, when the determined state is a first state, a first overlay image in which first sensor information based on a detection result of a second sensor among the plurality of sensors is overlaid on an image captured by the camera. The method includes causing the display to display, using the controller, when the determined state is a second state, a second overlay image in which second sensor information based on the detection result of the second sensor among the plurality of sensors is overlaid on the image captured by the camera. The second sensor information differs from the first sensor information.

A non-transitory computer-readable recording medium according to an aspect of the present disclosure includes computer program instructions to be executed by an electronic device including a display, a camera, a plurality of sensors, and a controller. The instructions cause the controller to determine a state of the electronic device on the basis of a detection result of a first sensor among the plurality of sensors. The instructions cause the controller to cause the display to display. when the determined state is a first state, a first overlay image in which first sensor information based on a detection result of a second sensor among the plurality of sensors is overlaid on an image captured by the camera. The instructions cause the controller to cause the display to display, when the determined state is a second state, a second overlay image in which second sensor information based on the detection result of the second sensor among the plurality of sensors is overlaid on the image captured by the camera. The second sensor information differs from the first sensor information.

An electronic device according to an aspect of the present disclosure includes a display, a camera, a plurality of sensors, and a controller. The controller determines a state of the electronic device on the basis of a detection result of a first sensor among the plurality of sensors. The controller causes the display to display, when the determined state is a first state, a first overlay image in which first sensor information based on a detection result of a second sensor among the plurality of sensors is overlaid on an image captured by the camera. The controller causes the display to display, when the determined state is a second state, a second overlay image in which second sensor information based on a detection result of a third sensor among the plurality of sensors is overlaid on the image captured by the camera.

A method according to an aspect of the present disclosure is a method for controlling an electronic device including a display, a camera, a plurality of sensors, and a controller. The method includes determining, using the controller, a state of the electronic device on the basis of a detection result of a first sensor among the plurality of sensors. The method includes causing the display to display, using the controller, when the determined state is a first state, a first overlay image in which first sensor information based on a detection result of a second sensor among the plurality of sensors is overlaid on an image captured by the camera. The method includes causing the display to display, using the controller, when the determined state is a second state, a second overlay image in which second sensor information based on a detection result of a third sensor among the plurality of sensors is overlaid on the image captured by the camera.

A non-transitory computer-readable recording medium according to an aspect of the present disclosure includes computer program instructions to be executed by an electronic device comprising a display, a camera, a plurality of sensors, and a controller. The instructions cause the controller to determine a state of the electronic device on the basis of a detection result of a first sensor among the plurality of sensors. The instructions cause the controller to cause the display to display, when the determined state is a first state, a first overlay image in which first sensor information based on a detection result of a second sensor among the plurality of sensors is overlaid on an image captured by the camera. The instructions cause the controller to cause the display to display, when the determined state is a second state, a second overlay image in which second sensor information based on a detection result of a third sensor among the plurality of sensors is overlaid on the image captured by the camera.

BRIEF DESCRIPTION OF THE DRAWINGS

In the accompanying drawings:

FIG. 6 illustrates an example of a settings screen;

FIG. 7 illustrates an example of the correspondence between exercise and sensor information that is overlaid;

FIG. 13 is a flowchart illustrating processing for controlling the electronic device (control method).

DETAILED DESCRIPTION

Further improvements in convenience are desired for displaying information detected by various sensors in an electronic device. It would therefore be helpful to provide an electronic device, a control method, and a recording medium with improved convenience. An electronic device, control method, and recording medium according to embodiments of the present disclosure can improve the convenience of displaying information detected by a sensor.

Figure 1:
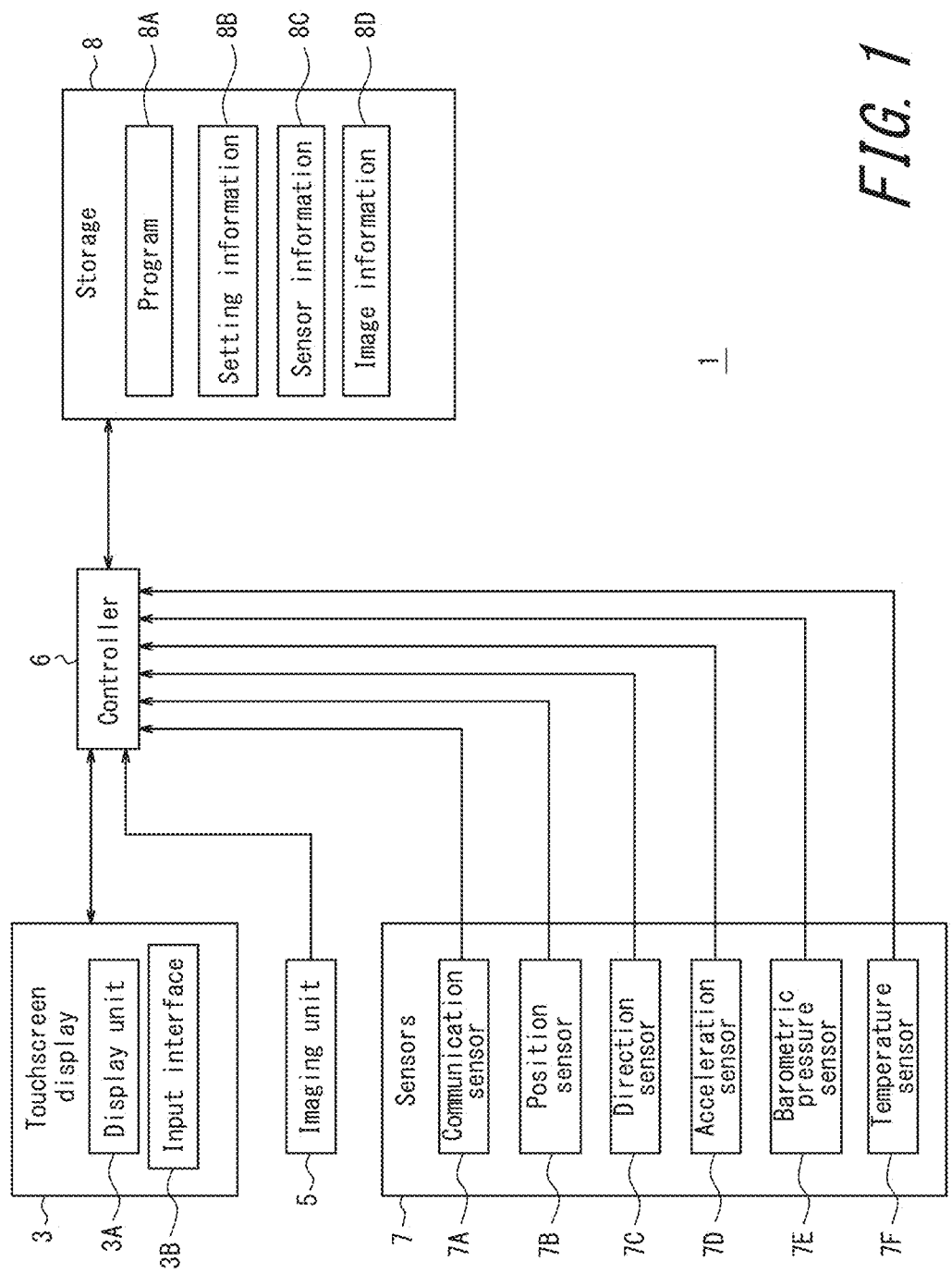
FIG. 1 is a functional block diagram illustrating the schematic configuration of an electronic device according to an embodiment.

FIG. 1 is a functional block diagram illustrating the schematic configuration of an electronic device 1 according to the present embodiment. As illustrated in FIG. 1, the electronic device 1 includes a touchscreen display 3, an imaging unit 5, a controller 6, sensors 7, and a storage 8. The components constituting these functional units are stored in or fixed to a housing 2, described below.

The touchscreen display 3 is an apparatus allowing data input by the touching of displayed images. The touchscreen display 3 includes a display unit 3A and an input interface 3B. The display unit 3A is provided with a display device such as a liquid crystal display, an organic Electro-Luminescence (EL) panel, or an inorganic EL panel. The display unit 3A displays information such as letters, images, symbols, and graphics. The information necessary for display on the display unit 3A is transmitted by the controller 6. The display unit 3A may include a backlight or the like as necessary.

The input interface 3B detects contact by a finger of the user operating the touchscreen display 3, a stylus, or the like. The input interface 3B can detect the position on the input interface 3B contacted by a finger, stylus, or the like. Any detection system may be used in the input interface 3B, such as a capacitive system, a resistive film system, a surface acoustic wave system (or an ultrasonic wave system), an infrared system, an electromagnetic induction system, a load detection system, or the like. The signal detected by the input interface 3B is output to the controller 6.

The imaging unit 5 is a camera for capturing images. The imaging unit 5 includes at least an optical system and an image sensor. The image sensor captures an image by conversion into an image signal of an image of a subject formed via the optical system on an optical detection surface. A Charge-Coupled Device (CCD) image sensor, a Complementary Metal Oxide Semiconductor (CMOS) image sensor, or the like is used as the image sensor. The image captured by the imaging unit 5 is output to the controller 6.

The sensors 7 detect information of a detection target. The sensors 7 can detect changes in the detection target by continuously detecting the detection target. The sensors 7 output the detected values to the controller 6. At least a portion of the detected values may be sensor information 8C, described below. In other words, at least a portion of the sensors 7 output information of the detection target to the controller 6 as sensor information 8C.

The sensors 7 include a communication sensor 7A, a position sensor 7B, a direction sensor 7C, an acceleration sensor 7D, a barometric pressure sensor 7E, and a temperature sensor 7F. A portion of these sensors may be omitted from the sensors 7. For example, the sensors 7 need not include the communication sensor 7A. The sensors 7 may also include a different sensor.

The communication sensor 7A transmits and receives information over a communication network. The communication sensor 7A refers to a functional unit that is a communication interface. Information acquired by the communication sensor 7A from an external server or the like is handled by the controller 6 in the same way as information of the other sensors 7. The communication method that the communication sensor 7A uses to transmit and receive information is prescribed by a wireless communication standard. Examples of wireless communication standards include $2^{nd}$ Generation (2G), $3^{rd}$ Generation (3G), and 4th Generation (4G). Other examples of wireless communication standards include Long Term Evolution (LTE), W-CDMA, CDMA2000, PDC, Global System for Mobile communications (GSM® (GSM is a registered trademark in Japan, other countries, or both)), and Personal Handy-phone System (PHS). Further examples of wireless communication standards include The Standard for Wireless Fidelity (WiFi), Worldwide Interoperability for Microwave Access (Wi-MAX), IEEE802.11, Bluetooth® (Bluetooth is a registered trademark in Japan, other countries, or both), Infrared Data Association (IrDA), and Near Field radio Communication (NFC). The communication sensor 7A may support one or more of the aforementioned communication standards.

The communication sensor 7A can acquire wind speed information indicating the wind speed at the position of the electronic device 1 from an external server or the like and output the wind speed information to the controller 6 as sensor information 8C. The communication sensor 7A may also acquire weather information, map information, mountain weather information, sea weather/wave information, snow information, sunrise/sunset information, tide information, or the like as sensor information 8C and output this information to the controller 6.

The position sensor 7B acquires position information indicating the position of the electronic device 1. For example, the position sensor 7B receives a GPS signal from a GPS satellite indicating the position of the GPS satellite, the transmission time of the signal, and the like. The position sensor 7B then acquires position information indicating the position of the electronic device 1 on the basis of the GPS signal. The position sensor 7B acquires the position information continuously to acquire travel path information on the basis of a history of positions indicated by the position information. The position sensor 7B calculates the change in position per unit time as the speed of the electronic device 1 to acquire speed information indicating the calculated speed. The position sensor 7B acquires distance information indicating the travel distance of the electronic device 1 calculated on the basis of the change in position. The position sensor 7B outputs the acquired position information, travel path information, speed information, and distance information to the controller 6 as sensor information 8C.

The direction sensor 7C is, for example, a magnetic sensor or a gyro sensor. The direction sensor 7C acquires direction information indicating the direction on the basis of a change in geomagnetism. The direction sensor 7C outputs the acquired direction information to the controller 6.

The acceleration sensor 7D acquires gravitational acceleration information indicating the gravitational acceleration of the electronic device 1. The acceleration sensor 7D outputs the gravitational acceleration information to the controller 6 as sensor information 8C.

The barometric pressure sensor 7E acquires barometric pressure information indicating the barometric pressure of the surrounding environment of the electronic device 1. The barometric pressure sensor 7E outputs the barometric pressure information to the controller 6 as sensor information 8C. As described below, the controller 6 can calculate height information of the location of the electronic device 1 on the basis of the acquired barometric pressure information. The barometric pressure sensor 7E may be individually waterproofed.

The temperature sensor 7F acquires temperature information indicating the temperature of the surrounding environment of the electronic device 1. The temperature sensor 7F also outputs the temperature information to the controller 6 as sensor information 8C.

The storage 8 stores a program 8A, setting information 8B, sensor information 8C, and image information 8D. The storage 8 may also be used as a working area to store results of processing by the controller 6 temporarily. The storage 8 may include any appropriate storage device, such as a semiconductor storage device or a magnetic storage device. The storage 8 may also include a plurality of types of storage devices. The storage 8 may include a combination of a portable storage medium, such as a memory card, and an apparatus for reading the storage medium.

The program 8A is a program for controlling the electronic device 1. The electronic device 1 executes various functions by the controller 6 following the instructions of the program 8A. The program 8A may be installed on the storage 8 through wireless communication via the communication sensor 7A or from a storage medium. The program 8A includes an overlay application for the controller 6 to execute overlay processing. Here, overlay processing includes processing to generate an overlay image by overlaying the sensor information 8C on an image captured by the imaging unit 5. The overlay processing also includes processing to store the overlay image in the storage 8 as the image information 8D on the basis of the setting information 8B. In the present disclosure, an "application" is short for an application program.

The setting information 8B is information on settings related to overlay processing designated by the user. The setting information 8B includes the table described below, for example.

The sensor information 8C is information acquired by the controller 6 from the sensors 7 and information generated on the basis of information acquired by the controller 6 from the sensors 7. In the present embodiment, the sensor information 8C is information that changes over time in accordance with changes in the state (for example, the surrounding environment) of the electronic device 1. The sensor information 8C is, for example, position information, travel path information, speed information, distance information, direction information, gravitational acceleration information, barometric pressure information, height information, temperature information, and the like. The sensor information 8C is not limited to the above types of information and may, for example, further include wind speed information, weather information, map information, mountain weather information, sea weather/wave information, snow information, sunrise/sunset information, tide information, and the like.

The image information 8D is information of images on which overlay processing has been performed. The image information 8D includes still images and moving images. The controller 6 can, for example, read the image information 8D from the storage 8 (such as a video on which overlay processing has been performed) and cause the image information 8D to be displayed on the touchscreen display 3.

The controller 6 may, for example, be a Central Processing Unit (CPU). The controller 6 may be a System-on-a-Chip (SoC) or other type of integrated circuit in which other components, such as the communication sensor 7A, are integrated. The controller 6 may be configured by combining a plurality of integrated circuits. The controller 6 controls the functional units of the electronic device 1 and implements a variety of functions by comprehensively controlling operations of the electronic device 1. Details of the operations of the controller 6 in the present embodiment are provided below.

The electronic device 1 of the present embodiment generates an image (overlay image) by overlaying sensor information 8C on a captured image and displays the overlay image on a display as a preview image. The electronic device 1 of the present embodiment can store the overlay image displayed on the display unit 3A in the storage 8. The electronic device 1 of the present embodiment overlays the sensor information 8C on the captured image when the image is captured. Furthermore, the electronic device 1 of the present embodiment stores the image with the sensor information 8C overlaid thereon. Consequently, the electronic device 1 of the present embodiment allows the user to reliably store captured images in real time after visually confirming that the sensor information 8C is overlaid on the captured image in a desired form (position, size, and the like).

Figure 2:
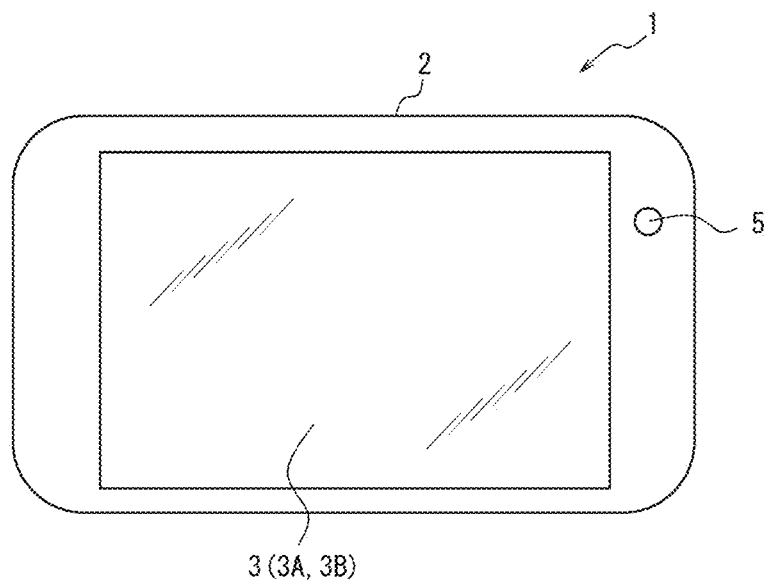
FIG. 2 is an external view of the electronic device in FIG. 1.

FIG. 2 is an external view of the electronic device 1. The electronic device 1 may, for example, be a smartphone but is not limited to being a smartphone. The electronic device 1 may, for example, be a feature phone, a tablet, or the like. The electronic device 1 may also be an imaging apparatus equipped with sensors, such as a digital camera or an action camera.

FIG. 2 illustrates the front of the electronic device 1, where the touchscreen display 3 is located. The housing 2 forms the outside of the electronic device 1 and protects the components of the electronic device 1, such as the touchscreen display 3, that are stored in or fixed to the housing 2.

As illustrated in FIG. 2, a portion of the imaging unit 5 (for example, a front camera) is provided on the front of the electronic device 1. The imaging unit 5 need not be provided on the front of the electronic device 1.

Figure 3:
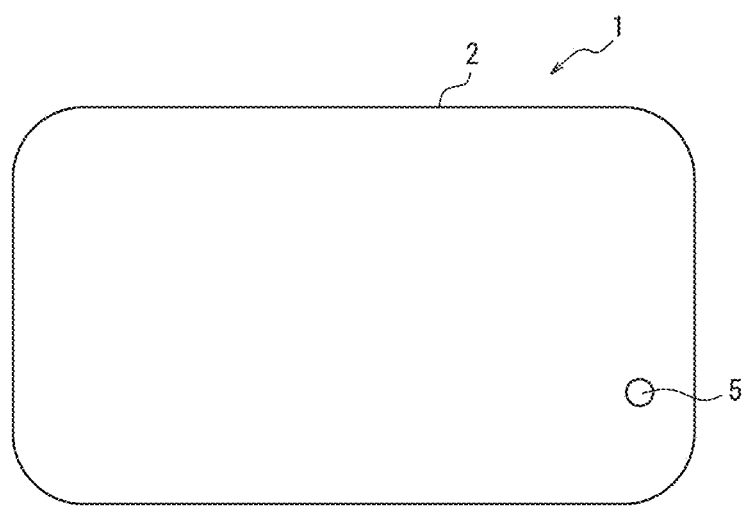
FIG. 3 is an external view of the electronic device in FIG. 1 from a different direction.

FIG. 3 illustrates the back of the electronic device 1, which is the opposite side from the front. As illustrated in FIG. 3, a portion of the imaging unit 5 (for example, a back camera) is provided on the back of the electronic device 1.

Figure 4:
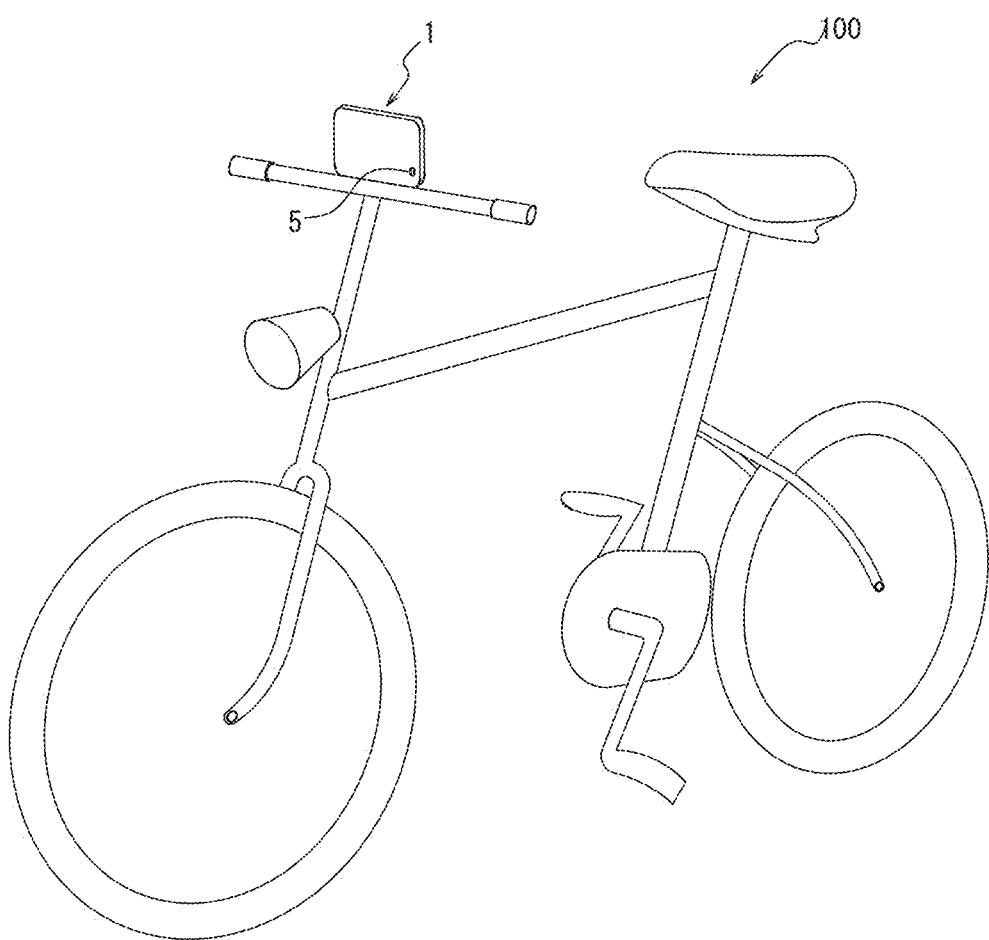
FIG. 4 illustrates an example of mounting the electronic device in FIG. 1 on a bicycle.

The electronic device 1 may, for example, be used while attached to the handlebars of a bicycle 100, as illustrated in FIG. 4. In this case, the electronic device 1 is attached with the imaging unit 5 facing any direction desired by the user, for example to capture images in the travel direction of the bicycle 100. The electronic device 1 is attached so as to allow the user to visually confirm the touchscreen display 3. Therefore, the user can, in real time, confirm images captured by the imaging unit 5 while the user is riding the bicycle 100.

Figure 5:
FIG. 5 illustrates an example of a user being equipped with the electronic device in FIG. 1 while diving.

The electronic device 1 may be held and used by the user while exercising. For example, the user can use the electronic device 1 while diving by holding an auxiliary apparatus 9 to which the electronic device 1 is attached, as illustrated in FIG. 5. In this case, the electronic device 1 is held so that the imaging unit 5 captures images in a direction desired by the user, such as the user's travel direction. The user can, for example, visually confirm the touchscreen display 3 of the electronic device 1 while holding the electronic device 1 and auxiliary apparatus 9 so that the imaging unit 5 captures images in the user's travel direction, as illustrated in FIG. 5. This allows the user to visually confirm, in real time, images captured by the imaging unit 5 while the user is exercising.

As described above, the controller 6 performs overlay processing with the overlay application. An overlay image in which the sensor information 8C is overlaid on the image captured by the imaging unit 5 is displayed on the display unit 3A by the overlay processing. The overlay image is also stored in the storage 8 by the overlay processing. The sensor information 8C overlaid on the captured image is selected by the user using the settings screen, described below.

FIG. 6 illustrates an example of a settings screen. Before the controller 6 starts the overlay processing, the user selects the sensor information 8C to be overlaid on the captured image using the settings screen in FIG. 6. The settings screen in FIG. 6 can, for example, be displayed by selection from a menu on an initial screen (top screen) of the electronic device 1.

The settings screen in FIG. 6 is for selecting the situation where the electronic device 1 is to be used. Specifically, the settings screen is for selecting what type of exercise the user will be doing when using the electronic device 1. The types of exercise selectable on the settings screen in FIG. 6 are "surfing/marine sports", "hiking", "skiing/snowboarding", "cycling", "fishing", "trekking", "diving", and "triathlon". The user selects one type of exercise by touching a radio button. The selected type of exercise is stored in the storage 8 as one piece of setting information 8B.

FIG. 7 illustrates an example of the correspondence between exercise (use) and the sensor information 8C that is overlaid on the captured image. In the table in FIG. 7, circles indicate correspondence between types of exercise and pieces of sensor information 8C. The table in FIG. 7 is stored in the storage 8 as one piece of setting information 8B.

The controller 6 reads the type of exercise selected by the user from the setting information 8B. The controller 6 then reads the table in FIG. 7 from the setting information 8B and determines the sensor information 8C corresponding to the selected type of exercise. For example, when the type of exercise selected by the user is fishing, the controller 6 determines that the sensor information 8C to be overlaid on a captured image is barometric pressure information, wind speed information, and temperature information. The controller 6 causes the display to display an overlay image in which the barometric pressure information, wind speed information, and temperature information is overlaid on a captured image. When instructed by the user, the controller 6 stores the overlay image.

On the basis of the table associating exercise and sensor information 8C to be overlaid on a captured image, the sensor information 8C is automatically determined in accordance with the type of exercise selected by the user. Therefore, the user can easily determine the sensor information 8C by simply selecting the situation in which the electronic device 1 is to be used (in the present embodiment, the exercise the user is going to perform).

Here, the settings screen may use checkboxes instead of radio buttons. In this case, the user can select one or more types of exercise. The controller 6 then overlays all of the sensor information 8C corresponding to the one or more selected types of exercise on a captured image.

The sensor information 8C to be overlaid on the captured image need not be restricted to the items of the sensor information 8C in the aforementioned table (speed information, distance information, height information, gravitational acceleration information, barometric pressure information, travel path information, wind speed information, direction information, and temperature information). The controller 6 may further overlay current time information on the captured image regardless of the type of exercise selected by the user. The controller 6 may further overlay position information on the captured image regardless of the type of exercise selected by the user. The controller 6 may further overlay elapsed time information on the captured image regardless of the type of exercise selected by the user. This information indicates the time elapsed from the start of storage of an overlay image that is a moving image.

Figure 8:
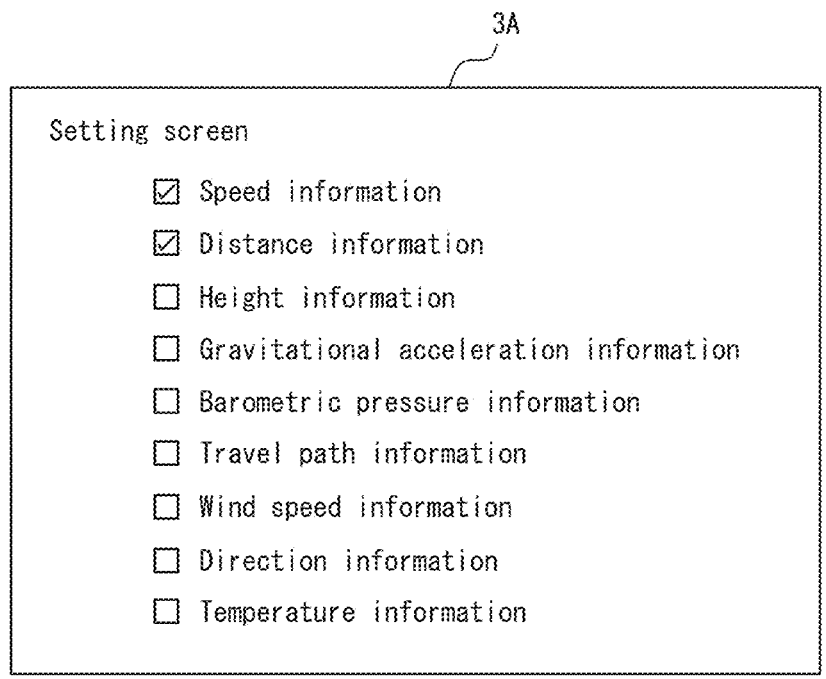
FIG. 8 illustrates an example of another settings screen.

FIG. 8 illustrates an example of another settings screen. In this example, the settings screen allows the user to individually select the sensor information 8C. As illustrated in FIG. 8, each type of sensor information 8C is displayed along with a checkbox on the settings screen. The user selects one or more types of sensor information 8C to overlay on the captured image by touching the checkboxes. The selected types of sensor information 8C are stored in the storage 8 as one piece of setting information 8B. The controller 6 reads the sensor information 8C selected by the user from the setting information 8B. The controller 6 causes the display to display an overlay image on which the selected sensor information 8C is overlaid. When instructed by the user, the controller 6 stores the overlay image.

When the settings screen in FIG. 8 is used, the user can individually set the sensor information 8C to be overlaid on the captured image. Users can therefore customize the overlay image to suit their preferences.

As yet another example, the settings screen in FIG. 6 (first settings screen) and the settings screen in FIG. 8 (second settings screen) may be used together. The user can cause the first settings screen or the second settings screen to be displayed using a menu on the initial screen of the electronic device 1, for example. The user first selects a type of exercise on the first settings screen. The selected type of exercise is stored in the storage 8 as one piece of setting information 8B. The controller 6 reads the type of exercise selected by the user from the setting information 8B. The controller 6 then reads the table in FIG. 7 from the setting information 8B and determines the sensor information 8C corresponding to the selected type of exercise. The controller 6 sets the checkboxes of the second settings screen to a default selection of the sensor information 8C corresponding to the selected type of exercise. In other words, the controller 6 stores initial values of the checkboxes of the second settings screen based on the selected type of exercise as one piece of setting information 8B. The user then selects or deselects sensor information 8C by touching the checkboxes on the second settings screen. The user can therefore adjust the sensor information 8C on the second settings screen.

For example, the user may select surfing/marine sports on the first settings screen. The controller 6 reads the table illustrated in FIG. 7 and sets the speed information, distance information, gravitational acceleration information, wind speed information, and temperature information as the types of sensor information 8C initially selected on the second settings screen. The controller 6 then causes the second settings screen to be displayed in response to a user operation. At this time, the checkboxes for the speed information, distance information, gravitational acceleration information, wind speed information, and temperature information are selected on the second settings screen. The user can select additional sensor information 8C or deselect sensor information 8C on the second settings screen. For example, if the user deselects the gravitational acceleration information, wind speed information, and temperature information, then only the speed information and distance information remain selected. In this way, the user can use the second settings screen to adjust the sensor information 8C corresponding to the type of exercise selected on the first settings screen. The user can therefore easily customize the sensor information 8C to be overlaid on the captured image.

After the sensor information 8C to be overlaid on the captured image is set, the controller 6 executes the overlay processing when the user performs a predetermined operation to initiate the overlay processing. An example of the predetermined operation is the touching of a predetermined object displayed on the touchscreen display 3.

When instructed to initiate the overlay processing, the controller 6 acquires the sensor information 8C to be overlaid on a captured image from the storage 8. The controller 6 then generates an overlay image by overlaying the sensor information 8C on the captured image. The controller 6 causes the display unit 3A to display the generated overlay image.

Figure 9:
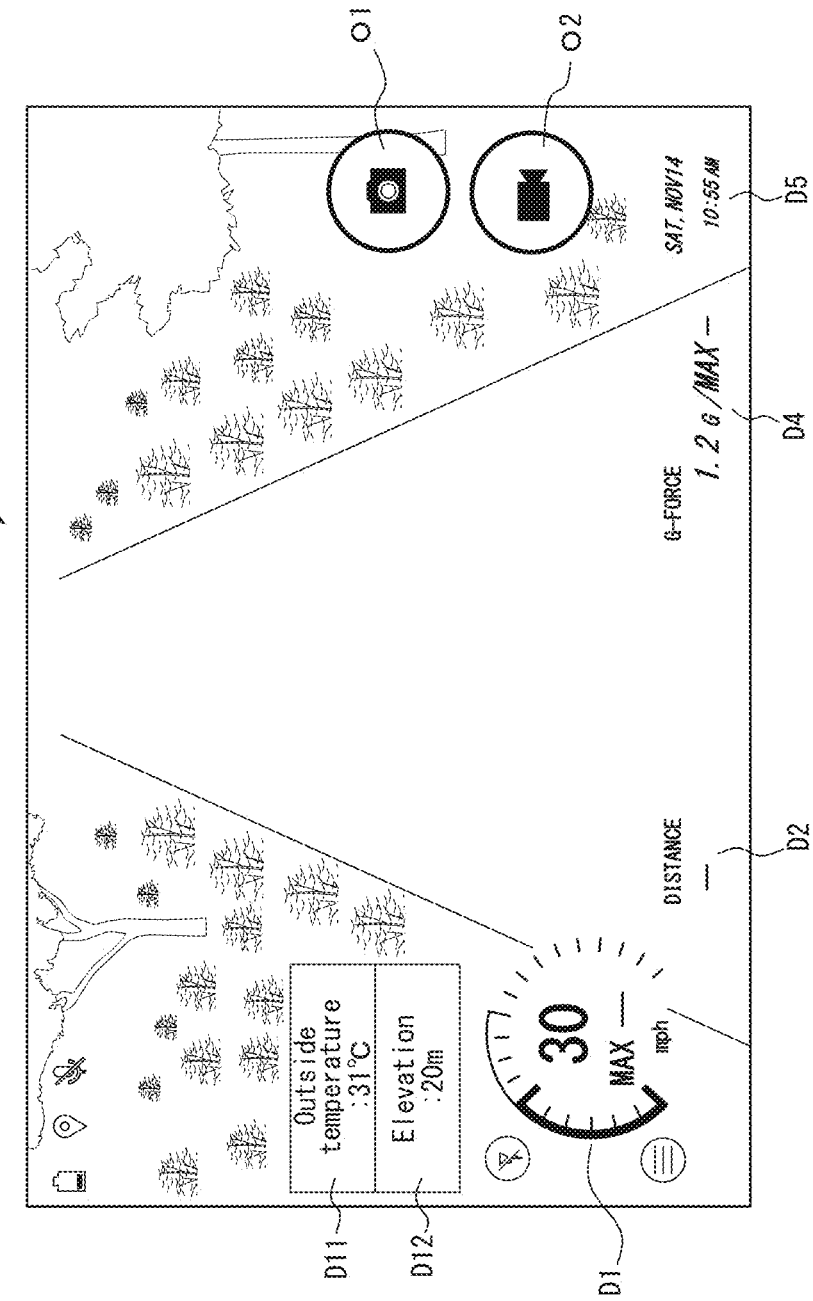
FIG. 9 illustrates an example of an overlay image displayed on a display unit.

FIG. 9 illustrates an example of an overlay image displayed on the display unit 3A. In the example in FIG. 9, the user is riding the bicycle 100. The electronic device 1 is used while attached to the handlebars of the bicycle 100.

The controller 6 causes the display to display an overlay image in which various information (speed information D1, distance information D2, gravitational acceleration information D4, current time information D5, temperature information D11, and height information D12) is overlaid on a captured image. As illustrated in FIG. 9, the various information overlaid on the captured image may be sensor information 8C that includes numerical information. The numerical information is information that changes over time. The various information overlaid on the captured image may be sensor information 8C that includes text information. The text information indicates the specific content of the numerical information.

For example, the gravitational acceleration information D4 illustrated in FIG. 9 is one type of sensor information 8C. The gravitational acceleration information D4 includes the numerical information "1.2 (G)". The gravitational acceleration information D4 also includes the text information "G-FORCE". The numerical information "1.2 (G)" in the gravitational acceleration information D4 changes over time. The text information "G-FORCE" indicates that "1.2 (G)" is the value of gravitational acceleration. The temperature information D11 illustrated in FIG. 9, for example, is also one type of sensor information 8C. The temperature information D11 includes the numerical information "31° C.". The temperature information D11 includes the text information "outside temperature". The numerical information in the temperature information D11 changes over time. The text information "outside temperature" indicates that "31° C." is the outside temperature.

The controller 6 may arrange the information (speed information D1, distance information D2, gravitational acceleration information D4, current time information D5, temperature information D11, and height information D12) at appropriate positions to avoid disturbing the user's exercise. In the example in FIG. 9, the user is riding the bicycle 100. Information is therefore preferably not overlaid on the central and upper central portions of the display unit 3A, where the road in the direction of travel is displayed. Rather, information is preferably displayed at the lower portion or near the sides of the captured image, as illustrated in FIG. 9.

Objects for user operation (at least one of a still image storage object O1, a moving image storage object O2, and an end object O3) are also displayed in the overlay image. The controller 6 causes the still image storage object O1, for example, to be displayed on the touchscreen display 3. The overlay image is stored as a still image when the user touches the still image storage object O1. The controller 6 also causes the moving image storage object O2, for example, to be displayed on the touchscreen display 3. The overlay image is stored as a moving image when the user touches the moving image storage object O2. The controller 6 causes the end object O3, for example, to be displayed on the touchscreen display 3 when storage of the moving image begins. Storage of the moving image ends when the user touches the end object O3. The end object O3 may be displayed instead of the still image storage object O1 and the moving image storage object O2. Unlike the information overlaid on the captured image (such as the speed information D1), the objects for user operation are not stored in the storage 8. In other words, objects are not displayed when the controller 6 reads the image information 8D from the storage 8 and causes the image information 8D to be displayed on the touchscreen display 3 (i.e. during reproduction). Information such as the speed information D1 and the distance information D2, for example, is displayed during reproduction.

Figure 10:
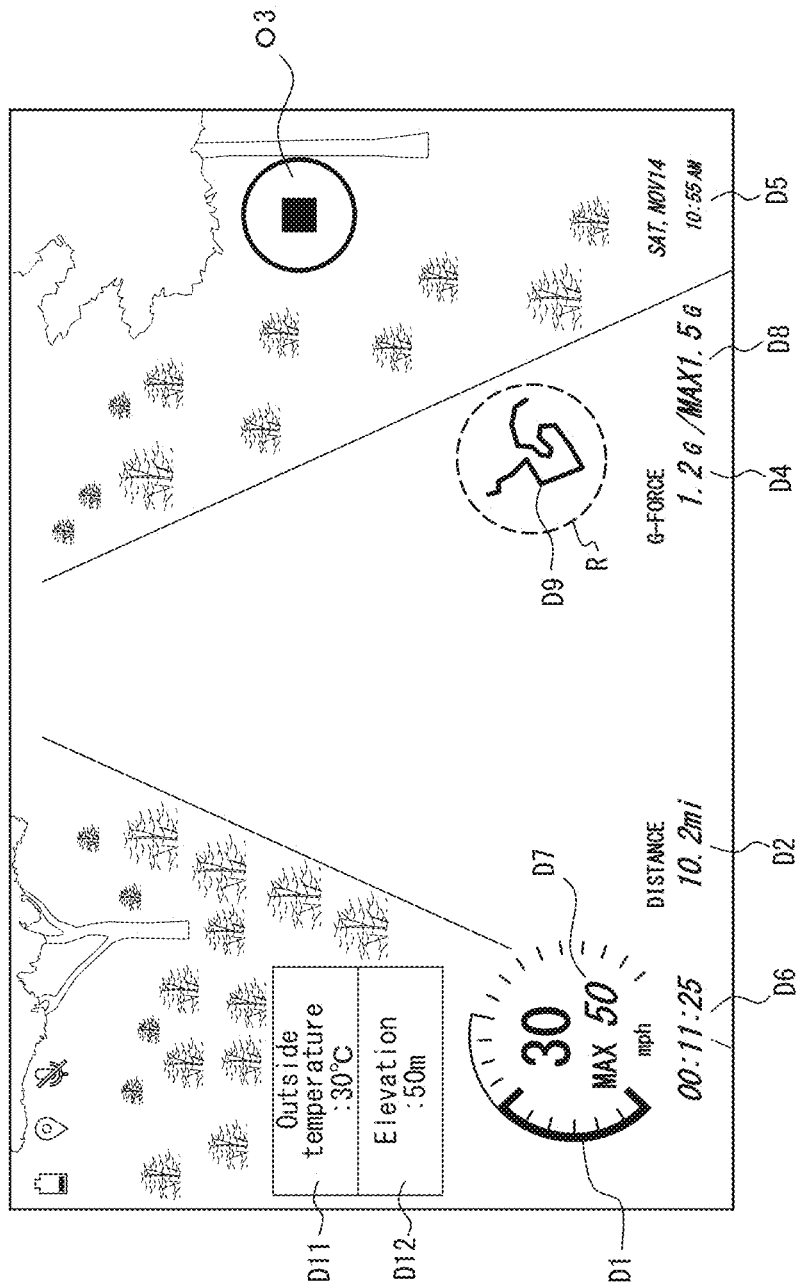
FIG. 10 illustrates another example of an overlay image displayed on the display unit.

FIG. 10 illustrates another example of an overlay image displayed on the display unit 3A. FIG. 10 illustrates an overlay image displayed after time has elapsed from the state in FIG. 9. As illustrated in FIG. 10, the information overlaid on the captured image may change (in this example, increase) over time. The controller 6 may overlay elapsed time information D6, indicating the time elapsed from the start of storage of the overlay image (moving image), on the captured image. The controller 6 may also overlay maximum speed information D7, indicating the maximum speed attained from the start of storage of the overlay image, on the captured image. The controller 6 may also overlay maximum gravitational acceleration information D8, indicating the maximum gravitational acceleration attained from the start of storage of the overlay image, on the captured image. The controller 6 may also overlay travel path information D9 on the captured image. The travel path information D9 includes an object showing a history, based on position information, of positions in actual space (the travel path). The object is reduced to be displayable in a predetermined region R.

The electronic device 1 is not limited to being used during exercise on level terrain (such as cycling) but may also be used during exercise on mountainous terrain (such as hiking) and underwater exercise (such as diving). For example, the barometric pressure sensor 7E detects the barometric pressure on level terrain and mountainous terrain and detects the water pressure underwater. In other words, the detected value (such as pressure) of one sensor 7 may have different names depending on the usage conditions of the electronic device 1. The communication sensor 7A, for example, acquires weather information, mountain weather information, and sea weather/wave information. Wind speed information based on the mountain weather information is useful during exercise on mountainous terrain (such as hiking). Information on the current, based on the sea weather/wave information, is useful during underwater exercise (such as diving). In other words, information from one sensor 7 needs to be appropriately selected in accordance with the usage conditions of the electronic device 1.

The information included in the overlay image (such as the temperature information D11) needs to be corrected when the information does not match the usage conditions of the electronic device 1. The user can also correct the information manually when the information does not match the usage conditions of the electronic device 1. Manual correction by the user is not practical, however, when the usage environment of the electronic device 1 changes dynamically (for example, during a triathlon) and when underwater, where it is generally difficult to perform precise operations on the touchscreen display 3 (for example, while diving).

As described below, the electronic device 1 of the present embodiment determines the usage environment and changes the display form so that appropriate information is included in the overlay image automatically.

Figure 11:
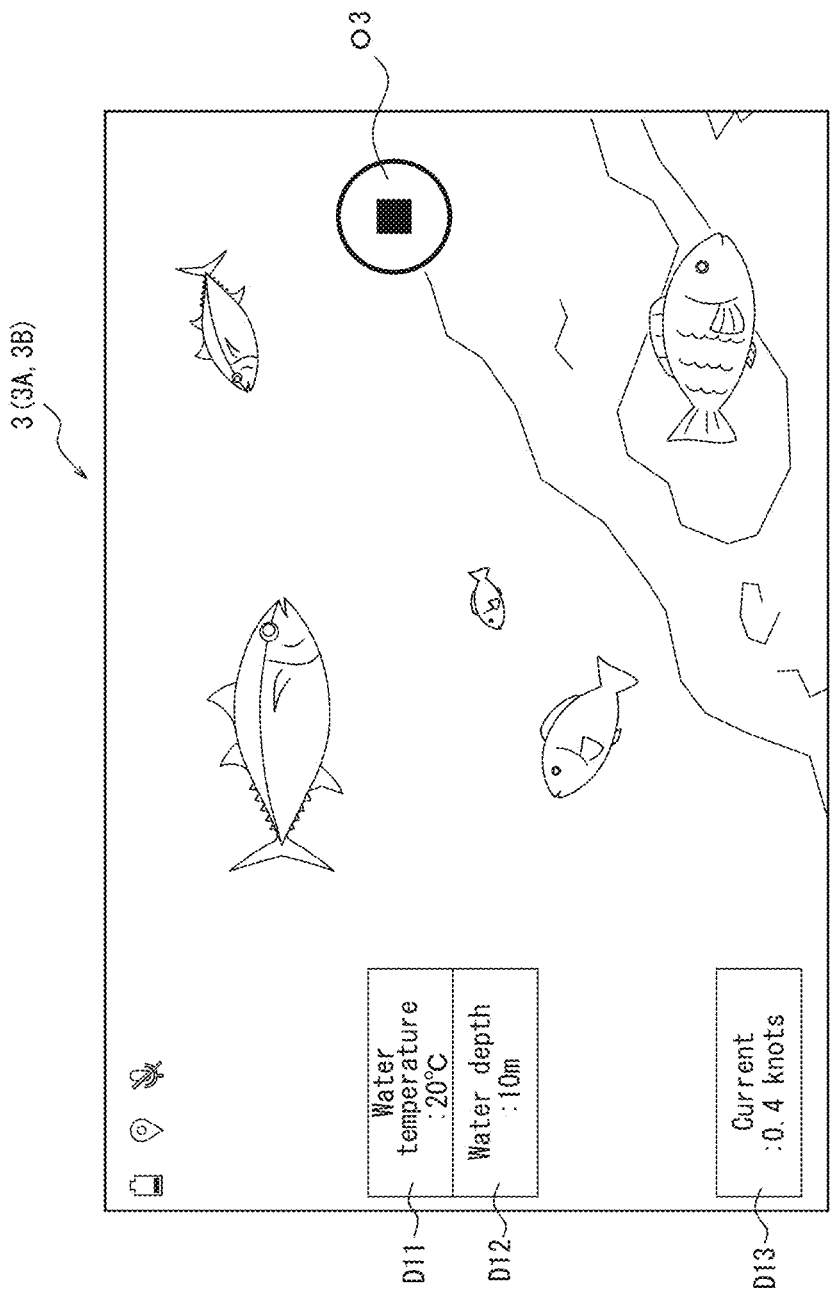
FIG. 11 illustrates yet another example of an overlay image displayed on the display unit.

FIG. 11 illustrates an example of an overlay image displayed on the display unit 3A. In the example in FIG. 11, the user is diving. The user has selected the temperature information, height information, and wind speed information in advance on the settings screen. Consequently, the overlay image in FIG. 11 includes temperature information D11, height information D12, and wind speed information D13. In the example in FIG. 12, the user is hiking. The sensor information 8C selected by the user on the settings screen is the same as in FIG. 11. Consequently, the overlay image in FIG. 12 includes temperature information D11, height information D12, and wind speed information D13.

Figure 12:
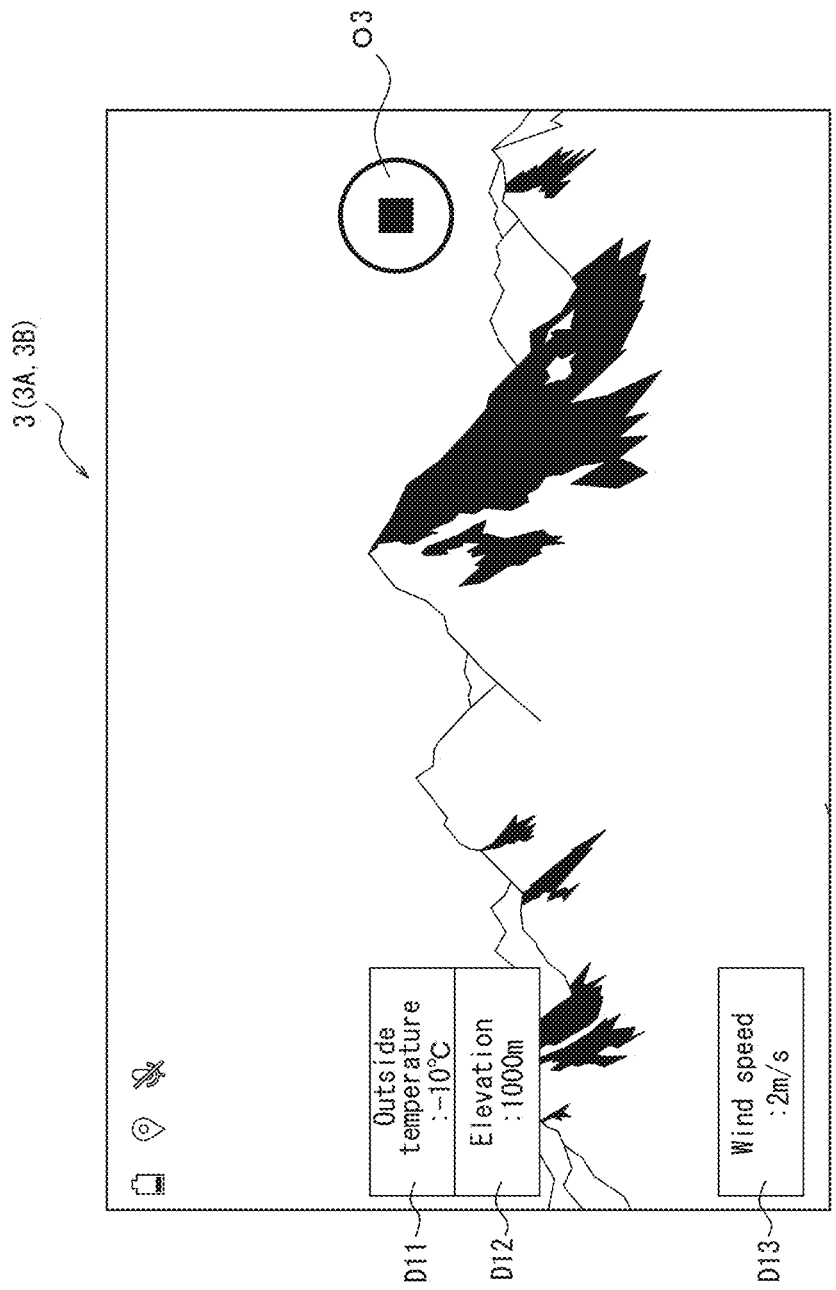
FIG. 12 illustrates yet another example of an overlay image displayed on the display unit.

As illustrated in FIG. 11 and FIG. 12, the text information of the temperature information D11, height information D12, and wind speed information D13 is appropriately displayed in accordance with the usage environment of the electronic device 1. The text information of the temperature information D11 in FIG. 11 is "water temperature", since the electronic device 1 is being used underwater. The text information of the temperature information D11 in FIG. 12 is "outside temperature", since the electronic device 1 is being used in mountainous terrain. The text information of the height information D12 in FIG. 11 is "water depth", since the electronic device 1 is being used underwater. The text information of the height information D12 in FIG. 12 is "elevation", since the electronic device 1 is being used in mountainous terrain. The text information of the wind speed information D13 in FIG. 11 is "current". The text information of the wind speed information D13 in FIG. 12 is "wind speed".

The controller 6 determines the state of the electronic device 1 on the basis of the detection result of a first sensor (such as the barometric pressure sensor 7E) among the plurality of sensors 7. In the examples in FIG. 11 and FIG. 12, the controller 6 determines that the usage environment of the electronic device 1 has changed from being on ground (level or mountainous terrain) to underwater when a change in pressure detected by the barometric pressure sensor 7E during a predetermined time (such as one minute) exceeds a predetermined value (such as 100 hPa). The pressure change on the ground is gradual, and a change of at least a predetermined value in a predetermined time is nearly impossible. Therefore, the controller 6 can determine that the usage environment has changed from being on ground to underwater when the pressure rises by more than a predetermined value in a predetermined time. The controller 6 can also determine that the usage environment has changed from being underwater to on ground when the pressure drops by more than a predetermined value in a predetermined time.

When the determined state is a first state (such as the electronic device 1 not being underwater), the controller 6 causes the display (display unit 3A) to display a first overlay image in which first sensor information based on the detection result of one or more second sensors among the plurality of sensors (such as the communication sensor 7A, barometric pressure sensor 7E, and temperature sensor 7F) is overlaid on an image captured by the camera (imaging unit 5). An example of the first overlay image is illustrated in FIG. 12. In the example in FIG. 12, the electronic device 1 is in the first state of not being underwater, and the text information of the temperature information D11, height information D12, and wind speed information D13, which are the first sensor information, is respectively "outside temperature", "elevation", and "wind speed".

When the determined state is a second state (such as the electronic device 1 being underwater), the controller 6 causes the display (display unit 3A) to display a second overlay image in which second sensor information based on the detection result of one or more second sensors among the plurality of sensors (such as the communication sensor 7A, barometric pressure sensor 7E, and temperature sensor 7F) is overlaid on an image captured by the camera (imaging unit 5). The second sensor information differs from the first sensor information. An example of the second overlay image is illustrated in FIG. 11. In the example in FIG. 11, the electronic device 1 is in the second state of being underwater, and the text information of the temperature information D11, height information D12, and wind speed information D13, which are the second sensor information, is respectively "water temperature", "water depth", and "current". In other words, the text information differs between the first sensor information and the second sensor information.

The controller 6 may calculate the numerical information of the first sensor information and the numerical information of the second sensor information with different calculation methods. For example, when the electronic device 1 is being used underwater, the water depth increases by 10 m for a rise in pressure of approximately 1 atmosphere. When the electronic device 1 is used in mountainous terrain, the elevation increases by 100 m for a drop in pressure of approximately 10 hPa. Calculations related to the height information D12 may be updated in accordance with the state of the electronic device 1 (the usage environment of the electronic device 1). In other words, the calculation method used by the controller 6 may differ between calculation of the water depth and calculation of elevation from the detection result of the barometric pressure sensor 7E (pressure). The calculation method for the height information D12 therefore differs between the first sensor information and the second sensor information, resulting in different numerical information. In the example in FIG. 11, the electronic device 1 is in the second state of being underwater, and the numerical information of the height information D12, which is second sensor information, is "10 (m)". In the example in FIG. 12, the electronic device 1 is in the first state of not being underwater, and the numerical information of the height information D12 is "1000 (m)".

In the examples in FIG. 11 and FIG. 12, there is only one first sensor (barometric pressure sensor 7E). The first sensor may, however, include a plurality of sensors 7. For example, the controller 6 may use the detection results of the barometric pressure sensor 7E and the position sensor 7B to determine the state of the electronic device 1. The controller 6 may use the detection result of the position sensor 7B to determine whether the electronic device 1 is located in an ocean or a river on a map and use this information in determining the state of the electronic device 1. In the examples in FIG. 11 and FIG. 12, the second sensor includes a plurality of sensors 7. The second sensor may, however, be only one sensor 7.

In the examples in FIG. 11 and FIG. 12, the barometric pressure sensor 7E is used as the first sensor for determining the state of the electronic device 1 and as the second sensor for overlaying the sensor information 8C on the captured image. The first sensor, however, need not include the same sensors 7 as the sensors 7 included in the second sensor. In other words, the one or more sensors 7 included in the first sensor and the one or more sensors 7 included in the second sensor need not overlap. For example, the second sensor need not include the barometric pressure sensor 7E.

In the present embodiment, the controller 6 continues to acquire the detection result of the first sensor during execution of the overlay processing and determines the state of the electronic device 1 on the basis of the detection result. At this time, the type of exercise selected by the user in advance on the settings screen, for example, does not particularly affect the determination of the state of the electronic device 1. However, the controller 6 may instead suspend the determination of the state of the electronic device 1 or restrict the timing of the determination in accordance with the user selection. For example, when the type of exercise the user selects in advance on the settings screen is assumed not to take place underwater (such as hiking, skiing/snowboarding, or cycling), the controller 6 may suspend determination of the state of the electronic device 1 or increase the time interval for determining the state of the electronic device 1. This can reduce the processing load of the controller 6.

FIG. 13 is a flowchart illustrating an example method for controlling the electronic device 1 of the present embodiment. The electronic device 1 starts the overlay processing when the user performs a predetermined operation (such as touching a predetermined icon). In accordance with the flowchart in FIG. 13, the controller 6 generates an overlay image corresponding to the determined state of the electronic device 1 and causes the display unit 3A to display the overlay image.

First, the controller 6 acquires an image captured by the imaging unit 5 (step S1).

The controller 6 acquires the detection result of the first sensor (step S2). The first sensor is, for example, the barometric pressure sensor 7E. At this time, the detection result is the value of the barometric pressure (pressure) of the surrounding environment of the electronic device 1. The controller 6 determines the state of the electronic device 1 on the basis of a change in the barometric pressure (pressure) of the surrounding environment of the electronic device 1 during a predetermined time.

When the determined state is the first state (step S3: Yes), the controller 6 proceeds to step S4. The first state is, for example, a state in which the electronic device 1 is not underwater.

The controller 6 generates the first overlay image on which the first sensor information is overlaid (step S4). The first sensor information is information such as the temperature information D11 ("outside temperature: −10° C."), height information D12 ("elevation: 1000 m"), and wind speed information D13 ("wind speed: 2 m/s") in FIG. 12.

The controller 6 causes the display unit 3A to display the first overlay image (step S5). Here, the user can store the first overlay image as a still image by touching the still image storage object O1. By touching the moving image storage object O2, the user can also store the first overlay image as a moving image until touching the end object O3.

When the determined state is not the first state, i.e. when the determined state is the second state (step S3: No), the controller 6 proceeds to step S6. The second state is, for example, a state in which the electronic device 1 is underwater.

The controller 6 generates the second overlay image on which the second sensor information is overlaid (step S6). The second sensor information is information such as the temperature information D11 ("water temperature: 20° C."), height information D12 ("water depth: 10 m"), and wind speed information D13 ("current: 0.4 knots") in FIG. 11. In the second sensor information, the text information such as water temperature, water depth, and current differs from the text information of the first sensor information in accordance with the electronic device 1 being in the second state (underwater). In other words, the display form of at least the text information of the second sensor information differs from the first sensor information.

The controller 6 causes the display unit 3A to display the second overlay image (step S7). Here, the user can store the second overlay image as a still image by touching the still image storage object O1. By touching the moving image storage object O2, the user can also store the second overlay image as a moving image until touching the end object O3.

The electronic device 1 of the present embodiment thus determines the state of the electronic device 1 on the basis of the detection result of the first sensor. The electronic device 1 automatically changes the display form of information detected by the sensors 7 in accordance with the state of the electronic device 1, without the need for the user to make manual corrections. Consequently, the electronic device 1 of the present embodiment improves the convenience of displaying information detected by the sensors. Having the electronic device 1 automatically change the display form of information detected by the sensors without the need for user operation is particularly useful in situations where the usage environment of the electronic device 1 can change dynamically, such as when the user is participating in a triathlon.

Although the subject matter of the present disclosure has been described with reference to the drawings and embodiments, it is to be noted that various changes and modifications will be apparent to those skilled in the art on the basis of the present disclosure. Therefore, such changes and modifications are to be understood as included within the scope of the present disclosure. For example, the functions and the like included in the various components, steps, and the like may be reordered in any logically consistent way. Furthermore, components, steps, and the like may be combined into one or divided.

The information included in the sensor information 8C may be generated by a different method than in the above embodiment. For example, the controller 6 may acquire the position information from the position sensor 7B and calculate the distance information on the basis of a change in the position. The controller 6 may generate the speed information by acquiring the value detected by the acceleration sensor 7D and integrating the effective acceleration component. In other words, the sensor information 8C may be generated by a functional block other than the sensors 7, such as the controller 6, that acquires the detected values of the sensors 7.

In the above embodiment, the overlay image is an appropriate image for when the user is exercising. The overlay image need not, however, be related to exercise. For example, the overlay image may change automatically when the user is moving in a vehicle. The controller 6 can overlay the travel path information on the captured image in a first color when the determined state is the first state (such as riding a train above ground) on the basis of the detection result of the barometric pressure sensor 7E. The controller 6 can overlay the travel path information on the captured image in a second color when the determined state is the second state (such as riding a subway) on the basis of the detection result of the barometric pressure sensor 7E.

The overlay image may, for example, change automatically in accordance with whether the user is inside or outside. When the determined state is the first state (for example, outside), the controller 6 sets the text information of the temperature information D11 overlaid on the captured image to "outside temperature". When the determined state is the second state (for example, inside), the controller 6 sets the text information of the temperature information D11 overlaid on the captured image to "indoor temperature".

The controller 6 can determine whether the user is inside or outside on the basis of whether the communication sensor 7A has transmitted or received information using an access point in the home or workplace, for example. When the sensors 7 include an illuminance sensor that detects the illuminance of surrounding light, the controller 6 can determine whether the user is inside or outside on the basis of the detected value of the illuminance sensor. For example, the controller 6 may determine that the user is outside when the detected value of the illuminance sensor exceeds a threshold of 2000 lux, which corresponds to the illuminance on a cloudy day approximately one hour after sunrise. When the sensors 7 include a gas sensor that detects volatile organic compounds (VOC), the controller 6 can determine whether the user is inside or outside on the basis of the detected value of the gas sensor. For example, the controller 6 may determine that the user is outside when the detected value of the gas sensor exceeds a threshold of 0.06 ppm in one hour.

The overlay image may, for example, change automatically in accordance with whether the vehicle that the user is riding is a train. When the determined state is the first state (for example, riding a train), the controller 6 overlays an index related to the surrounding environment on the captured image as a "discomfort index". When the determined state is the second state (for example, riding a car or the like), the controller 6 overlays an index related to the surrounding environment on the captured image as a "rest index". The index related to the surrounding environment may be calculated on the basis of the detected values of a sensor that measures humidity and the temperature sensor 7F. The detected value of a gas sensor that measures the concentration of carbon dioxide, for example, may be used in the calculation of the index related to the surrounding environment.

When the sensors 7 include a geomagnetic sensor, the controller 6 can determine whether the vehicle that the user is riding is a train on the basis of the detected value of the geomagnetic sensor. When the geomagnetic sensor detects a magnetic field produced by high-voltage power lines supplying a train, the controller 6 can determine that the user is riding a train.

In the above embodiment, the first sensor information overlaid on the captured image is based on the detection result of the second sensor when the determined state is the first state. The second sensor information overlaid on the captured image is based on the detection result of the second sensor when the determined state is the second state as well. Here, second sensor information based on the detection result of a third sensor that differs from the second sensor may be used when the determined state is the second state. In the present modification, the first sensor information and the second sensor information are based on the detection results of different sensors. The text information and the numerical information therefore differ between the first sensor information and the second sensor information in the present modification.

The second sensor may, for example, include the acceleration sensor 7D or the position sensor 7B. The third sensor may, for example, include the temperature sensor 7F or the barometric pressure sensor 7E. Like the first sensor and the second sensor, the third sensor may include a plurality of sensors 7.

When the user is participating in a triathlon, for example, and is riding a bicycle, the controller 6 determines that the electronic device 1 is in the first state (not underwater). At this time, the first sensor information based on the detection result of the second sensor (for example, the acceleration sensor or position sensor) is the speed information or position information of the bicycle. When the user is swimming, the controller 6 determines that the electronic device 1 is in the second state (underwater). At this time, the second sensor information based on the detection result of the third sensor (for example, the temperature sensor 7F or barometric pressure sensor 7E) is the water temperature or water pressure. The speed information (or position information) is useful when the electronic device 1 is in the first state (not underwater) but may become unnecessary when the electronic device 1 is in the second state (underwater). In the present modification, the water temperature (or water pressure) based on the detection result of the third sensor, which differs from the second sensor, is automatically displayed when the electronic device 1 is in the second state. Therefore, the user can acquire information that is appropriate (useful) for the circumstances from the electronic device 1. At this time, the user does not change settings manually. Consequently, the electronic device 1 of the present modification improves the convenience of displaying information detected by the sensor.

The display of the first sensor information based on the detection result of the second sensor and the display of the second sensor information based on the detection result of the third sensor may, for example, automatically change depending on whether the user is walking or riding a vehicle (such as a bicycle or a car). When the determined state is walking, the controller 6 can display the number of steps (an example of first sensor information) based on the detection result of the acceleration sensor 7D. When the determined state is riding, the controller 6 can display the speed (an example of second sensor information) based on the detection result of the position sensor 7B. The controller 6 can determine whether the user is walking or riding on the basis of the acceleration detected by the acceleration sensor 7D, for example.

When the sensors 7 include a geomagnetic sensor that detects the movement direction of the user, the controller 6 can determine whether the user is walking, riding a bicycle, or riding in a car on the basis of the detected values of the geomagnetic sensor and the acceleration sensor 7D. For example, the controller 6 detects the speed at the time of a change in the movement direction (such as a direction change of 90°). The controller 6 can identify the change in the movement direction on the basis of the detected value of the geomagnetic sensor. The speed can also be obtained by integrating the acceleration detected by the acceleration sensor 7D. When, for example, the speed at the time of a direction change of 90° exceeds a first threshold (such as 20 km/h), the controller 6 determines that the user is riding in a car. When the speed at the time of a direction change of 90° is equal to or less than the first threshold and exceeds a second threshold (such as 8 km/h), the controller 6 determines that the user is riding a bicycle. When the speed at the time of a direction change of 90° is equal to or less than the second threshold (such as 8 km/h), the controller 6 determines that the user is walking.

The controller 6 may switch a display of calorie consumption, which is based on the travel path information, on or off when the controller 6 is capable of determining whether the user is riding a bicycle or riding in a car. For example, the controller 6 may display the calorie consumption only when the user is riding a bicycle. In other words, the controller 6 may execute further changes in the display form (such as switching the display of a portion of information on or off) on the basis of the detected values of the sensors 7.

When the sensors 7 include a UV sensor that detects ultraviolet light, for example, the controller 6 may switch a display of the detected value of the UV sensor on or off in accordance with whether the user is inside or outside. For example, the controller 6 may display the detected value of the UV sensor only when the user is outside. The controller 6 may also switch a display of coupon information on or off in accordance with whether the user is inside a predetermined store. The user can be determined to be inside the predetermined store on the basis of the position information. The coupon information usable in the predetermined store can be acquired by the communication sensor 7A and stored in the storage 8. The controller 6 may also display train connection information only when the vehicle that the user is riding is a train. The train connection information can be acquired by the communication sensor 7A and stored in the storage 8. As described above, the controller 6 can determine whether the vehicle that the user is riding is a train on the basis of the detected value of the geomagnetic sensor.

At least one of the first sensor, the second sensor, and the third sensor may include a sensor identical to a sensor included in another one of the first sensor, the second sensor, and the third sensor. In other words, the sensor included in the first sensor, the sensor included in the second sensor, and the sensor included in the third sensor may overlap. The sensor included in the third sensor may overlap with the sensor included in the first sensor or the sensor included in the second sensor.

In some embodiments, "changes the display form of the overlay image automatically" can include a configuration that prompts the user to select whether to change the display form. In other words, when various information included in the overlay image does not match the usage conditions of the electronic device 1, "changes the display form of the overlay image automatically" refers to how a detailed setting operation for changing the display form, such as having the user select the situation or sensor information 8C on the settings screen to modify the information, is unnecessary. The controller 6 can, for example, causes the display unit 3A to display the text "OK to switch display of overlay image to underwater (on land) display?" as a pop-up display before changing the display form of the overlay image.

In another embodiment, the controller 6 may generate the overlay image and then store the overlay image in the storage 8 without causing the display unit 3A to display the overlay image. In other words, the controller 6 may generate the overlay image and then store the overlay image in the storage 8 while causing the display unit 3A to display a captured image on which overlay processing has not been performed.

In another embodiment, when the determined state is the first state (such as the electronic device 1 not being underwater), the controller 6 may store first sensor information in the storage 8 in association with an image captured by the camera (imaging unit 5) in the state determined to be the first state, without generating an overlay image. The first sensor information is based on the detection result of one or more second sensors among the plurality of sensors (such as the communication sensor 7A, barometric pressure sensor 7E, and temperature sensor 7F). When the determined state is the second state (such as the electronic device 1 being underwater), the controller 6 may store second sensor information in the storage 8 in association with an image captured by the camera (imaging unit 5) in the state determined to be the second state, without generating an overlay image. The second sensor information is based on the detection result of one or more second sensors among the plurality of sensors (such as the communication sensor 7A, barometric pressure sensor 7E, and temperature sensor 7F) and differs from the first sensor information. After storage of the captured image is complete, the first sensor information or second sensor information stored in association with the captured image may be overlaid on the captured image by user operation and then displayed on the display unit 3A or stored in the storage 8 as the first overlay image or the second overlay image.

The functions provided in the electronic device 1 may be implemented by a plurality of apparatuses. For example, the functions provided in the electronic device 1 may be implemented by a first apparatus that includes at least the imaging unit 5 and a second apparatus that includes at least the display unit 3A. The first apparatus and the second apparatus are connected in a wired or wireless manner. The first apparatus transmits at least an image captured by the imaging unit 5 to the second apparatus in a wired or wireless manner. Either the first apparatus or the second apparatus may perform the overlay processing on the captured image. When the first apparatus performs the overlay processing, the first apparatus transmits the overlay image to the second apparatus in a wired or wireless manner. The second apparatus displays the received overlay image on the display unit 3A. When the second apparatus performs the overlay processing, the first apparatus transmits a captured image, on which overlay processing has not been performed, and the sensor information 8C to the second apparatus in a wired or wireless manner. The second apparatus performs the overlay processing on the received captured image and displays the overlay image on the display unit 3A. The first and second apparatuses may, for example, be an action camera and a smartphone, or an action camera and a wearable device, but these examples are not limiting.

The invention claimed is:

1. An electronic device, comprising:
a display;
a camera;
a plurality of sensors; and
a controller configured to
 determine a state of the electronic device on the basis of a detection result of a first sensor among the plurality of sensors,
 cause the display to display, when the determined state is a first state, a first overlay image in which first sensor information based on a detection result of a second sensor among the plurality of sensors is overlaid on an image captured by the camera, and
 cause the display to display, when the determined state is a second state, a second overlay image in which second sensor information based on the detection result of the second sensor among the plurality of sensors is overlaid on the image captured by the camera,
wherein
the second sensor information differs from the first sensor information,
the first sensor information and the second sensor information include numerical information and text information based on the detection result of the second sensor,
the text information differs between the first sensor information and the second sensor information, and
the controller is configured to
 determine whether the electronic device is underwater on the basis of the detection result of the first sensor,
 cause the display to display the first overlay image when the electronic device is determined not to be underwater, and
 cause the display to display the second overlay image when the electronic device is determined to be underwater.

2. The electronic device of claim 1, wherein the first sensor comprises a number of sensors.

3. The electronic device of claim 1, wherein the second sensor comprises a number of sensors.

4. The electronic device of claim 1, wherein the first sensor comprises a sensor identical to a sensor comprised in the second sensor.

5. The electronic device of claim 1, wherein the second sensor comprises a temperature sensor.

6. The electronic device of claim 1, wherein the second sensor comprises a barometric pressure sensor.

7. The electronic device of claim 1, wherein
the numerical information in the first sensor information and the second sensor information are calculated on the basis of the detection result of the second sensor, and
a calculation method of the numerical information differs between the first sensor information and the second sensor information.

8. The electronic device of claim 3, wherein the second sensor comprises a temperature sensor.

9. The electronic device of claim 8, wherein the second sensor further comprises a barometric pressure sensor.

10. A method for controlling an electronic device comprising a display, a camera, a plurality of sensors, and a controller, the method comprising:
determining, using the controller, a state of the electronic device on the basis of a detection result of a first sensor among the plurality of sensors;
causing the display to display, using the controller, when the determined state is a first state, a first overlay image in which first sensor information based on a detection result of a second sensor among the plurality of sensors is overlaid on an image captured by the camera; and
causing the display to display, using the controller, when the determined state is a second state, a second overlay image in which second sensor information based on the detection result of the second sensor among the plurality of sensors is overlaid on the image captured by the camera,
wherein
the second sensor information differs from the first sensor information,
the first sensor information and the second sensor information include numerical information and text information based on the detection result of the second sensor,
the text information differs between the first sensor information and the second sensor information, and
the method further comprises
 determining whether the electronic device is underwater on the basis of the detection result of the first sensor,
 causing the display to display the first overlay image when the electronic device is determined not to be underwater, and
 causing the display to display the second overlay image when the electronic device is determined to be underwater.

11. A non-transitory computer-readable recording medium including computer program instructions to be executed by an electronic device comprising a display, a camera, a plurality of sensors, and a controller, the instructions causing the controller to:
determine a state of the electronic device on the basis of a detection result of a first sensor among the plurality of sensors;
cause the display to display, when the determined state is a first state, a first overlay image in which first sensor information based on a detection result of a second sensor among the plurality of sensors is overlaid on an image captured by the camera; and
cause the display to display, when the determined state is a second state, a second overlay image in which second sensor information based on the detection result of the second sensor among the plurality of sensors is overlaid on the image captured by the camera,
wherein
the second sensor information differs from the first sensor information,
the first sensor information and the second sensor information include numerical information and text information based on the detection result of the second sensor,
the text information differs between the first sensor information and the second sensor information, and
the instructions, when executed by the controller, cause the controller to further:

determine whether the electronic device is underwater on the basis of the detection result of the first sensor, cause the display to display the first overlay image when the electronic device is determined not to be underwater, and cause the display to display the second overlay image when the electronic device is determined to be underwater.

12. An electronic device, comprising:

a display;

a camera;

a plurality of sensors; and a controller configured to determine a state of the electronic device on the basis of a detection result of a first sensor among the plurality of sensors, cause the display to display, when the determined state is a first state, a first overlay image in which first sensor information based on a detection result of a second sensor among the plurality of sensors is overlaid on an image captured by the camera, and cause the display to display, when the determined state is a second state, a second overlay image in which second sensor information based on a detection result of a third sensor among the plurality of sensors is overlaid on the image captured by the camera, wherein the controller is configured to determine whether the electronic device is underwater on the basis of the detection result of the first sensor, cause the display to display the first overlay image when the electronic device is determined not to be underwater, and cause the display to display the second overlay image when the electronic device is determined to be underwater.

13. The electronic device of claim 12, wherein the first sensor comprises a number of sensors.

14. The electronic device of claim 12, wherein the second sensor comprises a number of sensors.

15. The electronic device of claim 12, wherein the third sensor comprises a number of sensors.

16. The electronic device of claim 12, wherein at least one of the first sensor, the second sensor, and the third sensor comprises a sensor identical to a sensor comprised in another one of the first sensor, the second sensor, and the third sensor.

17. The electronic device of claim 12, wherein the second sensor comprises an acceleration sensor or a position sensor, and the third sensor comprises a temperature sensor or a barometric pressure sensor.

18. A method for controlling an electronic device comprising a display, a camera, a plurality of sensors, and a controller, the method comprising:

determining, using the controller, a state of the electronic device on the basis of a detection result of a first sensor among the plurality of sensors;

causing the display to display, using the controller, when the determined state is a first state, a first overlay image in which first sensor information based on a detection result of a second sensor among the plurality of sensors is overlaid on an image captured by the camera; and causing the display to display, using the controller, when the determined state is a second state, a second overlay image in which second sensor information based on a detection result of a third sensor among the plurality of sensors is overlaid on the image captured by the camera, wherein the method further comprises determining whether the electronic device is underwater on the basis of the detection result of the first sensor, causing the display to display the first overlay image when the electronic device is determined not to be underwater, and causing the display to display the second overlay image when the electronic device is determined to be underwater.

19. A non-transitory computer-readable recording medium including computer program instructions to be executed by an electronic device comprising a display, a camera, a plurality of sensors, and a controller, the instructions causing the controller to:

determine a state of the electronic device on the basis of a detection result of a first sensor among the plurality of sensors;

cause the display to display, when the determined state is a first state, a first overlay image in which first sensor information based on a detection result of a second sensor among the plurality of sensors is overlaid on an image captured by the camera; and cause the display to display, when the determined state is a second state, a second overlay image in which second sensor information based on a detection result of a third sensor among the plurality of sensors is overlaid on the image captured by the camera, wherein the instructions, when executed by the controller, cause the controller to further:

determine whether the electronic device is underwater on the basis of the detection result of the first sensor, cause the display to display the first overlay image when the electronic device is determined not to be underwater, and cause the display to display the second overlay image when the electronic device is determined to be underwater.

* * * * *